United States Patent [19]

Parker

[11] 4,139,118
[45] Feb. 13, 1979

[54] PRESSURE VESSEL SAFETY INTERLOCK

[75] Inventor: Ernest P. Parker, Lowell, Mass.

[73] Assignee: Erect Pro, Inc., Spartanburg, S.C.

[21] Appl. No.: 830,158

[22] Filed: Sep. 20, 1977

[51] Int. Cl.² .............................................. B65D 45/00
[52] U.S. Cl. .................................... 220/316; 220/319; 220/DIG. 20
[58] Field of Search ............... 220/327, 316, 334, 319, 220/203, 206, DIG. 20; 251/333; 292/256.6, 256.71, 256.73, 301, DIG. 65, 251

[56] References Cited

U.S. PATENT DOCUMENTS

| 2,041,371 | 5/1936 | Rice | 251/250 |
|---|---|---|---|
| 2,869,752 | 1/1959 | Hall | 220/334 |
| 2,994,343 | 8/1961 | Banks | 251/333 |
| 3,054,594 | 9/1962 | Hecht | 251/333 |
| 3,141,008 | 7/1964 | Flick et al. | 220/327 |
| 3,349,947 | 10/1967 | Zamwalt | 292/256.71 |
| 3,458,083 | 7/1969 | Erwin, Jr. | 220/316 |
| 3,784,156 | 1/1974 | Paetzel et al. | 251/250 |
| 3,990,605 | 11/1976 | Hanke et al. | 220/316 |

FOREIGN PATENT DOCUMENTS 516446 1/1972 Switzerland ............................. 220/316

Primary Examiner—William Price
Assistant Examiner—Allan N. Shoap
Attorney, Agent, or Firm—Arthur L. Urban

[57] ABSTRACT

A safety interlock for a pressure vessel having a shell portion, a door portion and an opening in one of the portions, the interlock including a collar affixed to the outside of the pressure vessel surrounding the opening, the collar having a bore therethrough with an enlarged section extending partway toward the pressure vessel opening, a resilient ring seal disposed within the enlarged section of the bore, a guide bushing positioned within the enlarged section of the bore in contact with the seal, a support bracket affixed to another portion of the pressure vessel, a movable shear bolt carried by the support bracket, and means for advancing the shear bolt when the bolt is aligned with the pressure vessel opening through the guide bushing, ring seal and collar into contact with the opening of the pressure vessel and maintaining the end of the bolt tightly against the pressure vessel opening so a pressure can selectively be maintained within the vessel.

11 Claims, 4 Drawing Figures

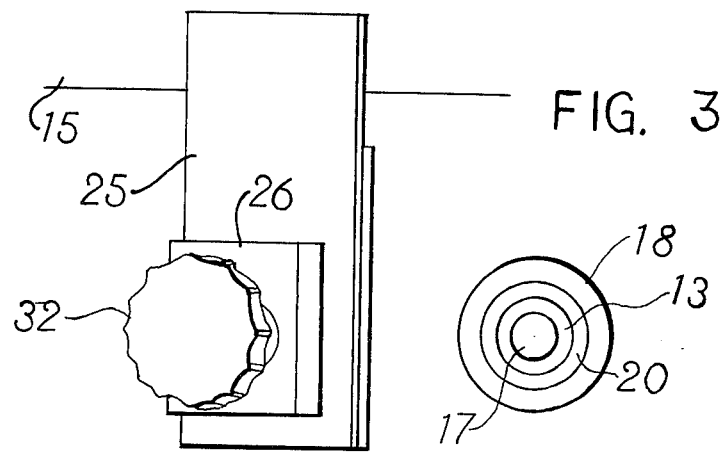
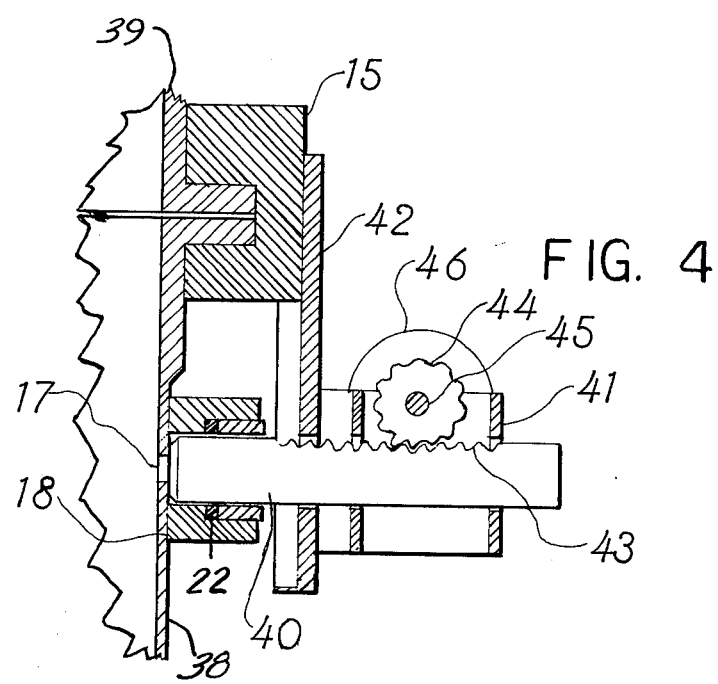

PRESSURE VESSEL SAFETY INTERLOCK

This invention relates to a novel interlock for a pressure vessel and more particularly relates to an interlock for a pressure vessel which has improved safety characteristics.

The use of quick-opening doors on pressure vessels has become quite common as equipment manufacturers have devoted greater attention toward increasing the operating efficiency of their products. With pressure vessels having quick-opening doors, it is possible to shorten the time for each cycle and thereby increase the number of cycles per shift or per day. For example, with a pressure dyeing machine, the cycle time can be reduced considerably if the time required for the opening and closing of the door at the end of one cycle and the beginning of the next cycle can be shortened.

One of the major problems encountered with pressure vessels equipped with quick-opening doors is the possibility that the door may be opened while the vessel still is under pressure. If an operator fails to perform the specified sequence of operating steps because he is in a hurry or not attentive to his work for some other reason, he may open the door of the vessel prematurely. This can injure the operatore severely and/or damage the vessel and its hardware. In addition, nearby personnel also can be injured and other equipment damaged.

A wide variety of safety mechanisms have been proposed in the past in an attempt to minimize or eliminate the above hazard. Such devices generally included electrical, hydraulic, pneumatic and/or mechanical systems. Most of the systems, e.g. electrical, hydraulic and pneumatic systems inherently are vulnerable because of the possibility of instrument malfunction or failure. Also, many of the systems are susceptible to alteration or removal by the operator or other personnel, thus defeating the intended purpose of the interlock.

A mechanical interlock described in U.S. Pat. No. 3,830,400 utilizes a combination of a ball valve, a pivoting bar and a pivoting handle. The interlock is removed by pivoting the handle which releases the ball valve and pivots the bar away from a slot in a locking ring. The mechanism is designed so that the ball valve will be opened before the bar pivots away from the locking ring slot.

However, since the handle of the interlock can be pivoted from a locked position to a fully open position in a fraction of a second, it is possible for the ball valve to be released and the bar to be removed from the locking ring slot while the vessel still is under pressure. To reduce the chance of such a situation developing, the patent describes a modified construction that utilizes a fluid cylinder which is flow connected to the pressure vessel to restrain the movement of the handle. The cylinder not only increases the complexity and cost of the mechanism, but also the cylinder is vulnerable to malfunction or failure.

The present invention provides a novel interlock for a pressure vessel, which interlock is simple in design and operation. The interlock of the invention utilizes a single structural component to test the atmosphere inside the vessel and to provide a safety lock for the vessel. Furthermore, the interlock incorporates a timing sequence with an automatic delay between the testing and the release of the safety lock. In addition, the operation of the interlock of the invention can be understood easily with a minimum of instruction and can be used conveniently during normal operation of the pressure vessel. Thus, obtaining acceptance by the operators does not present a problem. Also, the interlock of the invention is not susceptible to alteration or removal by unauthorized personnel attempting to disable the interlock.

Further, the interlock design utilizes a minimum number of moving parts so malfunction and/or failure of the interlock is greatly reduced. Moreover, the interlock does not require any electrical, hydraulic or pneumatic components, thus eliminating another cause of possible failure or error.

Other benefits and advantages of the novel pressure vessel interlock of the present invention will be apparent from the following description and the accompanying drawings in which:

FIG. 3 is an end view of the interlock shown in FIGS. 1 and 2 with the bolt assembly moved to an open position away from the opening in the pressure vessel; and FIG. 4 is a side elevation in section of another form of the novel interlock of the present invention.

Figure 1:
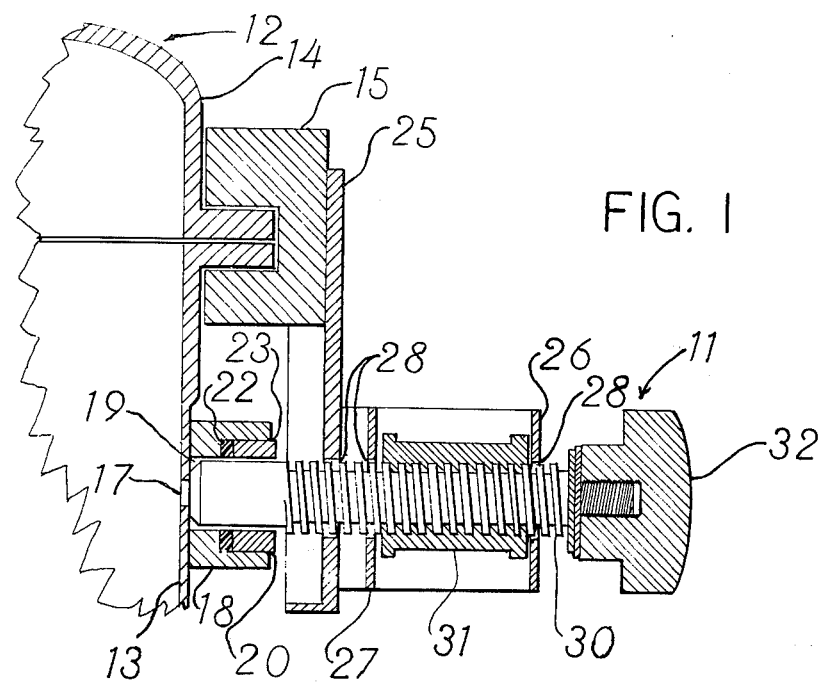
FIG. 1 is a side elevation in section of one form of the novel interlock of the present invention mounted on a pressure vessel.

As shown in the drawings, one form of the novel interlock 11 of the present invention is mounted on a pressure vessel 12. Vessel 12 has a shell portion 13, a door portion 14 and a locking ring 15. Shell portion 13 has an opening 17 with a surrounding collar 18 which is affixed to the outside of the vessel. Collar 18 has a bore 19 therethrough with an enlarged section 20 extending partway toward the opening 17.

A resilient ring seal 22 is disposed within the enlarged section 20 of the bore 19 and a guide bushing 23 is positioned within the enlarged section in contact with the seal. Seal 22 preferably is a double row Teflon lip seal with a garter spring, although other types of seals such as O rings or compression washers may be employed. Advantageously, bushing 23 is bronze and collar 18 is stainless steel.

Support bracket 25 is affixed at its upper end to locking ring 15 such as by welding and extends downwardly toward opening 17. Support bracket 25 has a main plate section with a U-shaped section 26 extending outwardly therefrom away from opening 17 aligned with that opening. Section 26 has an internal guide section 27 and support bracket 25, U-section 26 and guide section 27 each have an opening 28, which openings are aligned to receive a threaded bolt 30 which engages a captive thrust nut 31 disposed between sections 26 and 27. A handle or knob 32 is secured to the end of bolt 30 extending from section 26 to facilitate rotation of bolt 30 into contact with opening 17 in the pressure vessel shell. The bolt 30 has an unthreaded smooth end portion to facilitate engagement with guide bushing 23, ring seal 22 and collar 18.

FIG. 4 illustrates another form of the interlock of the invention. As shown, a sliding bolt 40 is carried by a housing 41 affixed to a support bracket 42 which is affixed to a portion 38 of a vessel. A second portion 39 of the vessel mates with portion 38. Portions 38 and 39 can be interchangeably the door and shell portions of the vessel. Bolt 40 has a rack section 43 on the end thereof opposite to the smooth end portion engageable with collar 18 and opening 17. Movement of bolt 40 toward and away from opening 17 is effected by pinion 44 rotatably mounted on shaft 45 secured to housing 41 and engageable with rack section 43. Pinion 44 may be rotated by a hand wheel affixed to shaft 45 or as shown may be rotated by drive means such as reversible motor 46.

Figure 2:
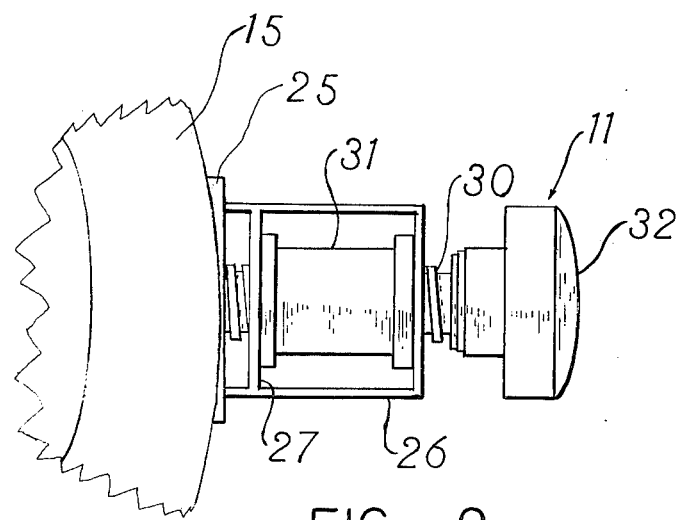
FIG. 2 is a top view of the interlock shown in FIG. 1.

The interlock of the present invention as shown in FIGS. 1-3 of the drawings is mounted on pressure vessel 12 by drilling into shell 13 to form opening 17 and welding collar 18 to the outside of the shell in a position surrounding the opening. Ring seal 22 and bushing 23 are positioned in enlarged section 20 of the bore 19 of collar 18.

Thrust nut 31 is inserted between sections 26 and 27 of support bracket 25 and bolt 30 is threaded through the nut. Bolt 30 is threaded through the nut 31 with the knob-engaging end first. Advantageously, the smooth, non-threaded end portion of bolt 30 is of a size larger than the threaded portion of the bolt so the bolt cannot be removed after the interlock is mounted on the pressure vessel. Thereafter, knob 32 is fastened on the threaded end of bolt 30.

The support bracket 25 with bolt 30 and nut 31 attached thereto then is affixed to locking ring 15, preferably by welding. The support bracket 25 is positioned on the locking ring 15 so bolt 30 will be aligned with opening 17 when the ring is in its locked position sealing the door portion 14 to the shell portion 13.

In the operation of the interlock of the present invention as shown in FIGS. 1-3 of the drawings, the pressure vessel 12 is loaded, for example, with textiles such as yarn or fabric. Thereafter, the door 14 is closed and the locking ring 15 is rotated into its locked position to seal the vessel. In this locked position, the bolt 30 of the interlock is aligned with opening 17 and collar 18. Knob 32 on the end of bolt 30 then is rotated to advance the bolt through bushing 23, seal 22 and collar 18 until the smooth portion of the bolt is tightly in contact with opening 17 and the opening is sealed.

The pressure vessel 12 then is ready for a normal processing cycle. For example, with a pressure dyeing cycle, dye liquor under pressure is circulated through the vessel for the desired period of time. Upon completion of the cycle, the operator checks the condition of the pressure vessel by rotating knob 32 to withdraw the end of the bolt 30 from contact with opening 17. As the knob is rotated, any liquid or pressurized fluid within the vessel will be vented through opening 17. If any effluent is observed, the operator will immediately retighten the bolt 30 and reinitiate the appropriate vessel exhausting step. On the other hand, if the operator does not observe any effluent from opening 17, he will continue rotation of knob 32 to withdraw bolt 30 from collar 18, seal 22 and bushing 23. When the end of bolt 30 is free of collar 18, the locking ring 15 can be rotated to an unlocked position as shown in FIG. 3 and the door 14 opened for unloading of the vessel.

The interlock of the invention shown in FIG. 4 is assembled and operates in a manner similar to that described above except the bolt 40 undergoes sliding movement into contact with opening 17. This movement of bolt 40 is effected by the rotation of pinion 44 which engages the rack portion 43 of the bolt. Rotation of pinion 44 is accomplished by actuating motor 46. This construction also permits resealing of opening 17 by reversing the rotation of pinion 44 if the operator observes effluent flowing from opening 17.

The above description and the accompanying drawings show that the present invention provides a novel interlock for pressure vessels. The interlock of the invention is simple in design and operation. The interlock utilizes a single structural component to test or check the atmosphere inside the vessel and to provide a safety lock for the vessel. Another unique feature of the interlock of the invention is its timing sequence which incorporates an automatic delay between the testing function and the lock release function. Moreover, operator acceptance is not a problem as with some interlocks since the operation of the interlock is easily understood with only a minimum of instruction and the interlock can be used conveniently during normal operation of the vessel. In addition, the interlock is not susceptible to alteration or removal by unauthorized personnel attempting to disable the interlock. Furthermore, the interlock of the present invention utilizes a minimum number of moving parts and does not require any electrical, hydraulic or pneumatic components. Thus, malfunction and/or failure of the interlock is substantially eliminated.

It will be apparent that various modifications can be made in the specific interlock described in detail above and shown in the drawings within the scope of the present invention. For example, while the drawings show the bolt assembly welded to the locking ring and the opening in the shell, the bolt assembly also may be mounted on the door or on the shell of the pressure vessel with the opening being located in a different part of the vessel. The specific location of the interlock of the invention will depend upon the particular design of the vessel and the requirements of the process being employed. Another variation which can be made is the use of other means to effect movement of the bolt toward and away from the opening in the pressure vessel. Therefore, the invention is to be limited only by the following claims.

What is claimed is:

1. A safety interlock for a pressure vessel having a shell portion, a door portion and an aperture in one of said portions to be sealed off by a shear bolt, said interlock including a collar affixed to the outside of said pressure vessel circumferentially surrounding the pressure vessel aperture and projecting outwardly therefrom, said collar having a bore therethrough with an enlarged circumferential section extending partway toward said pressure vessel aperture, a resilient ring seal disposed within said enlarged section of said bore, a guide bushing positioned within said enlarged section of said bore in contact with said seal for aligning said shear bolt, a support bracket affixed to another portion of said pressure vessel, said support bracket having an aperture linearly alignable with and spaced from said collar and said pressure vessel aperture, said shear bolt movably carried by said support bracket, and means for advancing said shear bolt linearly toward and away from said pressure vessel aperture through said guide bushing, ring seal and collar into contact with said pressure vessel aperture when said bolt is aligned therewith to selectively maintain a pressure within said vessel.

2. A safety interlock according to claim 1 wherein said bolt advancing means incorporates an automatic delay between the withdrawal of the end of said bolt from contact with said pressure vessel aperture and withdrawal of the end of said bolt from said collar.

3. A safety interlock according to claim 1 wherein said shear bolt is movable radially of said pressure vessel.

4. A safety interlock according to claim 1 wherein said shear bolt is a threaded bolt engageable with a thrust nut carried by said support bracket.

5. A safety interlock according to claim 1 wherein said shear bolt is a sliding bolt.

6. A safety interlock according to claim 5 wherein said means for advancing said sliding bolt includes a rotatable pinion engageable with a rack portion on said sliding bolt.

7. A safety interlock according to claim 1 wherein said means for advancing said bolt includes drive means.

8. A safety interlock according to claim 1 wherein said pressure vessel aperture is located in said shell portion and said bolt and said support bracket are located on another portion of said pressure vessel.

9. A safety interlock according to claim 1 wherein said pressure vessel aperture is located in said door portion and said bolt and said support bracket are located on another portion of said pressure vessel.

10. A safety interlock according to claim 1 wherein said pressure vessel includes a locking ring rotatable to a locked position in which said bolt is aligned with said opening.

11. A safety interlock according to claim 1 wherein said resilient seal is a Teflon seal.

* * * * *